United States Patent
Tsubaki et al.

(10) Patent No.: US 7,848,080 B2
(45) Date of Patent: Dec. 7, 2010

(54) ELECTROLYTIC CAPACITOR

(75) Inventors: Masami Tsubaki, Kyoto (JP); Hisao Nagara, Kyoto (JP); Kazumitsu Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 12/064,263

(22) PCT Filed: Oct. 10, 2006

(86) PCT No.: PCT/JP2006/320168

§ 371 (c)(1), (2), (4) Date: Feb. 20, 2008

(87) PCT Pub. No.: WO2007/046259

PCT Pub. Date: Apr. 26, 2007

(65) Prior Publication Data
US 2009/0086410 A1  Apr. 2, 2009

(30) Foreign Application Priority Data

Oct. 17, 2005 (JP) .............................. 2005-301470
Jan. 23, 2006 (JP) .............................. 2006-013390

(51) Int. Cl.
*H01G 9/00* (2006.01)
*H01G 9/02* (2006.01)
(52) U.S. Cl. ..................... 361/503; 252/62.2
(58) Field of Classification Search ............... 361/503, 361/505; 252/62.2
See application file for complete search history.

(56) References Cited

U.S. PATENT DOCUMENTS 4,240,128 A * 12/1980 Van Alphen et al. ........ 361/516
5,733,661 A    3/1998 Ue et al.

FOREIGN PATENT DOCUMENTS

| EP | 0 684 620 | 11/1995 |
|----|-----------|---------|
| JP | 63-274054 | 11/1988 |
| JP | 63-291414 | 11/1988 |
| JP | 2-077109 | 3/1990 |
| JP | 7-142293 | 6/1995 |
| JP | 2002-080927 | 3/2002 |
| JP | 2002-217073 | 8/2002 |
| WO | 95/15572 | 6/1995 |

OTHER PUBLICATIONS

International Search Report issued Jan. 9, 2007 in the International (PCT) Application of which the present application is the U.S. National Stage.
German Office Action issued Mar. 30, 2010 in corresponding International (PCT) Application (with partial English translation).

* cited by examiner

*Primary Examiner*—Eric Thomas
(74) *Attorney, Agent, or Firm*—Wenderoth, Lind & Ponack, L.L.P.

(57) ABSTRACT

The electrolytic capacitor includes a capacitor element and an electrolyte solution with which the capacitor element is impregnated. The capacitor element is composed of a positive electrode made of a valve metal, an etched negative electrode containing copper, and a separator disposed therebetween. The electrolyte solution contains complex salt of an azole ring compound with copper ions.

5 Claims, 2 Drawing Sheets

ELECTROLYTIC CAPACITOR

This application is a U.S. national phase application of PCT international application PCT/JP2006/320168, filed Oct. 10, 2006.

TECHNICAL FIELD

The present invention relates to an electrolytic capacitor used for various types of electronic devices.

BACKGROUND ART

The miniaturization and weight reduction of electronic devices are being promoted. Meanwhile, soldering temperature in assembling electronic devices tends to rise. Consequently, aluminum electrolytic capacitors used for electronic devices require miniaturization and greater capacitance with thermal stability against leakage of an electrolyte solution and a short circuit.

High temperatures may cause electrolyte leakage from an aluminum electrolytic capacitor. Aluminum foil for a negative electrode and a lead wire connected to the foil electrochemically react with the electrolyte solution at high temperatures, thereby increasing the amount of hydroxide in the electrolyte solution near the lead wire. Deterioration of a sealing member due to the alkalization is supposed to be the cause of electrolyte leakage.

Meanwhile, miniaturization and greater capacitance require the surface area of a negative electrode to be expanded by etching, and thus aluminum foil containing 0.1% to 0.5% of copper is generally used for a negative electrode. However, if copper contained in the negative electrode is dissolved into the electrolyte solution and is re-precipitated, a short circuit occurs.

International Patent Publication No. 95/15572 discloses an electrolyte solution produced by dissolving amidine salt made of an alkyl substituent amidine group and carboxylic acid, into a solvent containing γ-butyrolactone, as an electrolyte solution with less leakage. It also describes that the electrolyte solution improves the low-temperature characteristics of an aluminum electrolytic capacitor and excels in thermal stability. However, this type of aluminum electrolytic capacitor, if aluminum foil containing copper is used for the negative electrode, causes the above-described short circuit particularly in a high-temperature, high-humidity environment.

Meanwhile, Japanese Patent Unexamined Publication No. H02-77109 discloses a technique for preventing re-precipitation of copper by forming complex salt with copper dissolved from aluminum foil, using an electrolyte solution including a solvent containing ethylene glycol and others with ethylenediaminetetraacetic acid added thereinto. However, ethylenediaminetetraacetic acid forms complex salt also with aluminum ions dissolved into the electrolyte solution, and thus may insufficiently prevent a short circuit due to dissolution and re-precipitation of copper.

SUMMARY OF THE INVENTION

The present invention prevents electrolyte leakage and a short circuit caused by dissolution and re-precipitation of copper present in the negative electrode, to provide an electrolytic capacitor with high capacitance and high reliability. The electrolytic capacitor of the present invention includes a capacitor element and an electrolyte solution with which the capacitor element is impregnated. The capacitor element is composed of a positive electrode made of a valve metal; an etched negative electrode containing copper; and a separator disposed between these electrodes. The electrolyte solution contains complex salt of an azole ring compound with copper ions. The azole ring compound in the electrolyte solution forms the complex salt selectively with copper, and the complex salt is stably present in the electrolyte solution, thereby suppressing a short circuit caused by re-precipitation of copper dissolved from the negative electrode. Furthermore, the azole ring compound suppresses electrolyte leakage.

DETAILED DESCRIPTION OF PREFERRED EMBODIMENT

Figure 1:
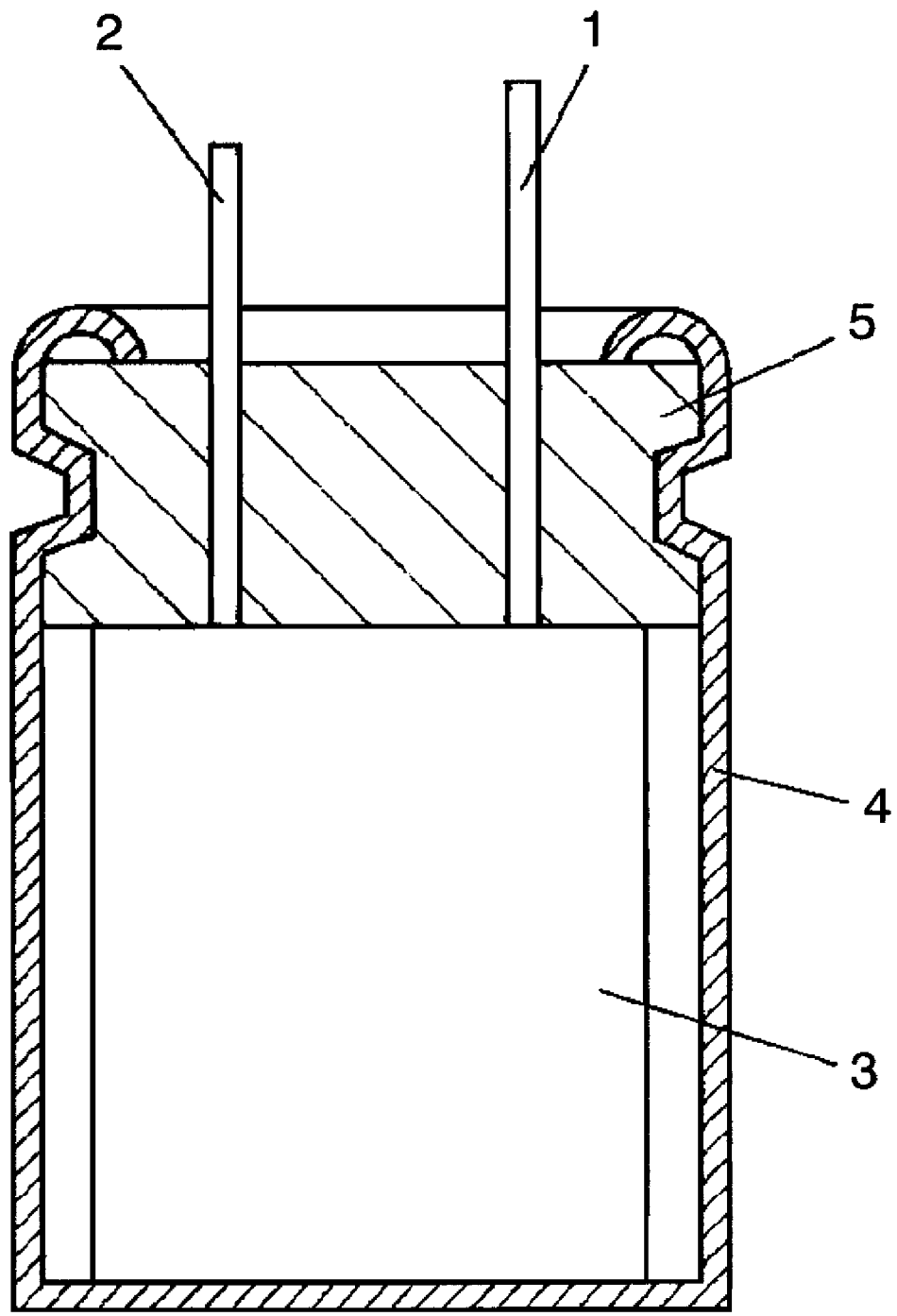
FIG. 1 is a sectional view illustrating the structure of an aluminum electrolytic capacitor according to an embodiment of the present invention.
Figure 2:
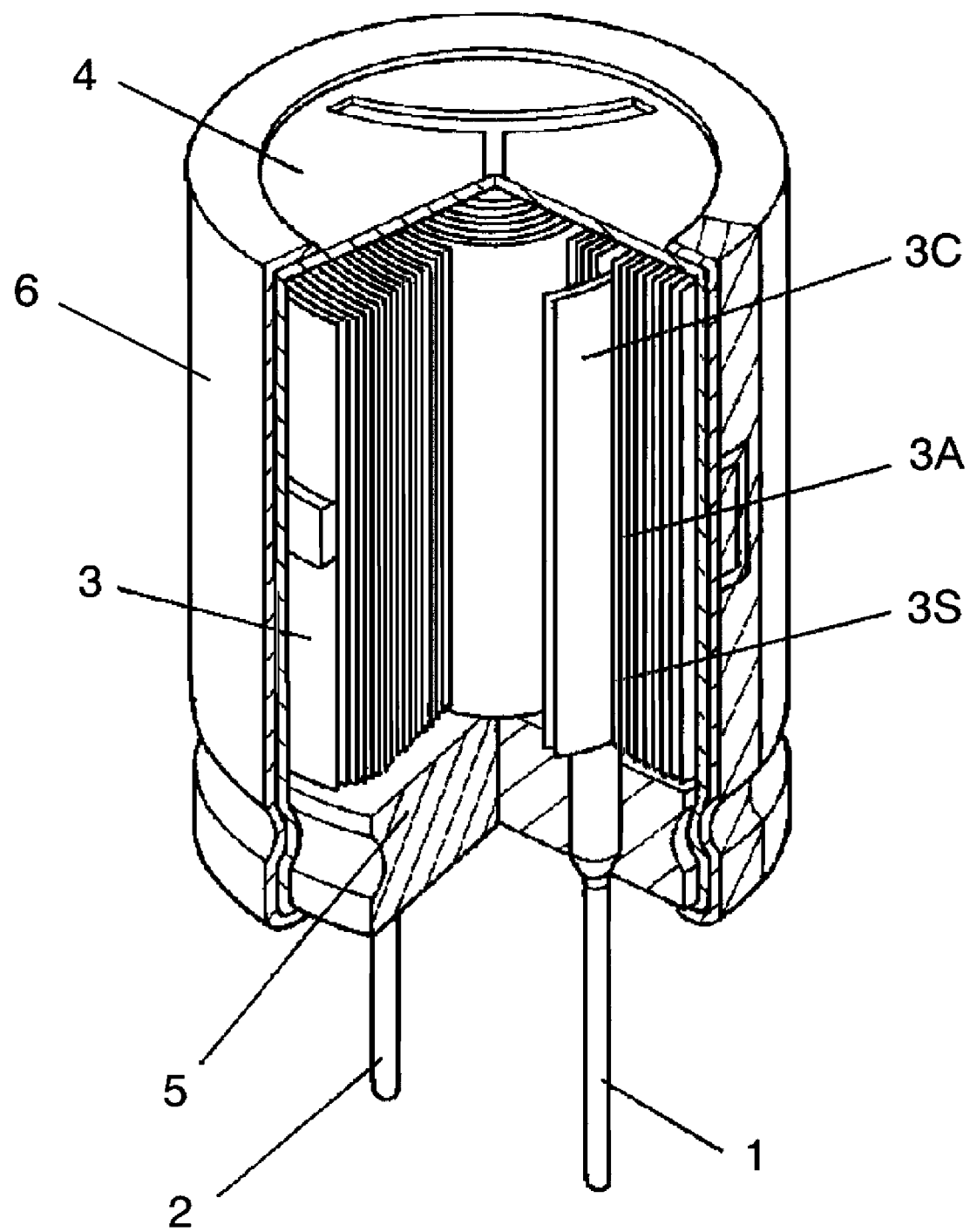
FIG. 2 is a partially cutaway perspective view of the aluminum electrolytic capacitor according to the embodiment of the present invention.

FIG. 1 is a sectional view illustrating the structure of an aluminum electrolytic capacitor according to an embodiment of the present invention. FIG. 2 is a partially cutaway perspective view of the same. Capacitor element 3 is formed from positive electrode 3A and negative electrode 3C mutually facing, rolled up with separator 3S disposed therebetween. Positive electrode 3A, made of an aluminum foil, has a dielectric oxide film formed by anodic oxidation on the surface with its effective surface area enlarged by etching. Lead 1 for leading is connected to positive electrode 3A. Negative electrode 3C, made of an aluminum foil containing copper, etched, is connected to lead 2 for leading. Capacitor element 3 is impregnated with an electrolyte solution (not shown), and is inserted into case 4 with a bottom, made of aluminum, and the opening of case 4 is sealed with sealing member 5. Case 4 is covered with covering resin 6.

The electrolyte solution of the electrolytic capacitor according to the embodiment contains complex salt of an azole ring compound with copper ions. Owing to this composition, the complex salt of the azole ring compound in the electrolyte solution with copper ions prevents copper contained in the aluminum foil of negative electrode 3C from dissolution and re-precipitation. Furthermore, the azole ring compound suppresses electrolyte leakage, and thus an electrolytic capacitor with high capacitance and high reliability can be produced.

The complex salt of an azole ring compound with copper ions is preliminarily added into the electrolyte solution. Otherwise, the following method may be used. That is, an electrolyte solution with an azole ring compound added is prepared; the electrolyte solution is reacted with copper contained in negative electrode 3C when capacitor element 3 is impregnated with the electrolyte solution so that the complex salt is contained in the electrolyte solution.

As specific azole ring compounds, imidazole, 1-methyl imidazole, benzimidazole, benzotriazole, and 1-ethyl imidazole can be used. These may be used alone or two or more of them may be mixed.

Complex salt of an azole ring compound with copper ions is preferably contained in the electrolyte solution at a concentration of at least 0.01 wt % and at most 2.0 wt %. If less than 0.01 wt %, a small quantity of complex salt inadequately suppresses a short circuit caused by dissolution and re-precipitation of copper. Meanwhile, exceeding 2.0 wt % decreases the conductivity of the electrolyte solution, thereby increasing the equivalent series resistance of the capacitor.

The electrolyte solution is preferably that containing γ-butyrolactone with high conductivity and favorable low-temperature characteristics, as its primary solvent; or an aqueous electrolyte solution containing water as its primary solvent. In addition, a mixture may be made of γ-butyrolactone as the primary solvent; and water, alcohols such as ethylene glycol and glycerine, or sulfolane, as the secondary solvent. Such a mixed solvent desirably contains 30 wt % to 70 wt % of γ-butyrolactone. More than 70 wt % of the secondary solvent decreases the electrochemical stability of the electrolyte solution to increase the inner pressure of the electrolytic capacitor when applying voltage, thus resulting in insufficient leakage resistance.

The secondary solvent used for an electrolyte solution containing water as its primary solvent is preferably ethylene glycol. Such a mixed solvent desirably contains 35 wt % or more of water. Water free from a secondary solvent may be used as a solvent.

As an electrolytic in the electrolyte solution, acid or its salt containing one or more of inorganic acid, organic acid, inorganic acid salt, and organic acid salt. Above all, dibasic acid such as boric acid, phosphoric acid, formic acid, azelaic acid, adipic acid, glutaric acid, phthalic acid, maleic acid, benzoic acid, 5,6-decanedicarboxylic acid, 1,7-octanecarboxylic acid, or 1,6-decanedicarboxylic acid or its salt is preferable. As the above-described salt, ammonium salt, amine salt, quaternary ammonium salt, amidine-compound salt, or others can be used.

Above all, an electrochemically stable salt or its mixture is desirably used of phthalic acid or maleic acid with a compound having an alkyl substituent amidine group. Using phthalic acid or maleic acid as an electrolyte decreases the amount of gas generated when applying voltage and suppresses the inner pressure rise of the electrolytic capacitor, thus resulting in sufficient leakage resistance.

Further, various kinds of additives may be mixed into the electrolyte solution when required. Adding an additive allows the value of a corrosion current in the electrolyte solution to be adjusted. The additives include a phosphorus compound (e.g. phosphoric acid, phosphoester), boron compound (e.g. boric acid, boric acid ester, boric acid salt [e.g. ammonium borate], complex compound of boric acid and polysaccharides [e.g. mannitol, sorbitol]), nitro compound (e.g. p-nitrophenol, m-nitrophenol, o-nitrophenol, p-nitrobenzoic acid, m-nitrobenzoic acid, o-nitrobenzoic acid, 3-nitrophthalate, 4-nitrophthalate), and organic acid (e.g. maleic acid, o-phthalic acid, benzoic acid, adipic acid, resolcil acid). Above all, what is preferable is a nitro compound, which facilitates changing a cathode reaction.

Sealing member 5 is desirably made of butyl rubber, excellent in chemical resistance. As methods of vulcanizing of butyl rubber, peroxide vulcanization, resin vulcanization, and quinoid vulcanization are known. As the filler mixed into the butyl rubber, inorganic compounds such as aluminum silicate and calcium carbonate are known. Any of the above vulcanizing methods and butyl rubber with any of the above fillers may be used. However, sulfur-vulcanized butyl rubber, the vulcanizing agent of which is sulfur, represents a significant degradation in elastic modulus at high temperatures, thus resulting in insufficient leakage resistance.

Next, a description is made for advantages of the embodiment using some concrete examples.

Practical Example 1

First, a description is made for how an electrolytic capacitor of sample 1 is produced. After the surface of aluminum foil is roughened by etching, a dielectric oxide film (formation voltage: 15V) is formed by anodization to produce positive electrode 3A. Meanwhile, aluminum foil containing 0.3% of copper in bulk is etched to produce negative electrode 3C. Next, positive electrode 3A and negative electrode 3C are rolled up with separator 3S (a mix-made paper of Manila paper and craft paper, thickness: 50 μm, weight: 40 g/m$^2$) disposed between them to produce capacitor element 3.

Next, capacitor element 3 is impregnated with an electrolyte solution containing complex salt (0.005 wt %) of an azole ring compound (1-methyl imidazole) with copper ions. Here, the electrolyte solution contains 25 wt % of tetramethylimidazolinium phthalate, 3 wt % of p-nitrobenzoic acid, 1 wt % of monobutyl phosphoester, and the rest of γ-butyrolactone.

Then, after capacitor element 3 is inserted into case 4, the opening of case 4 is sealed with sealing member 5 made of resin-vulcanized butyl rubber by curling case 4. Sealing member 5 is composed of 30 wt % of butyl rubber polymer, 20 wt % of carbon, and 50 wt % of inorganic filler, with a hardness of 70 IRHD (International Rubber Hardness Degrees). An electrolytic capacitor having rated voltage of 10 V, capacitance of 330 μF, diameter of 8.0 mm, and height of 11.5 mm is thus produced as sample 1.

Samples 2 through 6 are produced in the same way as for sample 1 except that the concentration of complex salt of an azole ring compound with copper ions in the electrolyte solution is changed. In addition, capacitor element 3 is impregnated with an electrolyte solution free from complex salt of an azole ring compound with copper ions to produce comparative sample 1.

Each 20 pieces of Samples 1 through 6, and comparative sample 1 are thus prepared, and reliability tests are performed in an environment with temperature of 85° C. and relative humidity of 90%, at no load for 2,000 hours. After the tests complete, each sample is examined for leakage and a short circuit caused by copper precipitation. The specifications and evaluation results of each sample are shown in table 1.

TABLE 1

| | Blending quantity of complex salt of 1-methylimidazole with copper ions (wt %) | Leaks in high-temperature and high-humidity test | Short circuit occurrences |
|---|---|---|---|
| Sample 1 | 0.005 | 1 | 2 |
| Sample 2 | 0.01 | 0 | 0 |
| Sample 3 | 0.1 | 0 | 0 |
| Sample 4 | 1.0 | 0 | 0 |
| Sample 5 | 2.0 | 0 | 0 |
| Sample 6 | 2.5 | 0 | 0 |
| Comparative sample 1 | 0 | 5 | 15 |

As evidenced by table 1, the electrolyte solutions of samples 1 through 6 contain complex salt of 1-methyl imidazole with copper ions, and the complex salt is stably present in the electrolyte solutions owing to the resonance stabilization of 1-methyl imidazole, which is an azole ring compound. This state suppresses dissolution of copper from negative electrode 3C and re-precipitation of it. This results in preventing electrolyte leakage by virtue of an azole ring compound in a high-temperature, high-humidity environment, and additionally suppressing a short circuit caused by dissolution and re-precipitation of copper present on the surface of negative electrode 3C.

For sample 1, containing less than 0.01 wt % of complex salt of 1-methyl imidazole with copper ions in the electrolyte solution, a small amount of complex salt causes a short circuit due to copper precipitation. For sample 6, containing more than 2.0 wt % of complex salt, although a short circuit due to copper precipitation does not occur, the conductivity of the electrolyte solution decreases, and thus the equivalent series resistance of the electrolytic capacitor increases. From these facts, the content of complex salt of 1-methyl imidazole with copper ions in the electrolyte solution is preferably at least 0.01 wt % and at most 2.0 wt %.

Practical Example 2

Samples 7 through 12 in this practical example are produced in the same way as in practical example 1 except that the azole ring compound is benzotriazole, and the content of complex salt of the azole ring compound with copper ions in the electrolyte solution is changed. In samples 13 through 18, the azole ring compound is imidazole; in samples 19 through 24, benzimidazole. After reliability tests are performed for samples 7 through 24 in the same way as in practical example 1, each sample is examined for leakage and a short circuit caused by copper precipitation. The specifications and evaluation results of each sample are shown in tables 2 through 4.

TABLE 2

| | Blending quantity of complex salt of benzotriazole with copper ions (wt %) | Leaks in high-temperature and high-humidity test | Short circuit occurrences |
|---|---|---|---|
| Sample 7 | 0.005 | 1 | 2 |
| Sample 8 | 0.01 | 0 | 0 |
| Sample 9 | 0.1 | 0 | 0 |
| Sample 10 | 1.0 | 0 | 0 |
| Sample 11 | 2.0 | 0 | 0 |
| Sample 12 | 2.5 | 0 | 0 |

TABLE 3

| | Blending quantity of complex salt of imidazole with copper ions (wt %) | Leaks in high-temperature and high-humidity test | Short circuit occurrences |
|---|---|---|---|
| Sample 13 | 0.005 | 1 | 2 |
| Sample 14 | 0.01 | 0 | 0 |
| Sample 15 | 0.1 | 0 | 0 |
| Sample 16 | 1.0 | 0 | 0 |
| Sample 17 | 2.0 | 0 | 0 |
| Sample 18 | 2.5 | 0 | 0 |

TABLE 4

| | Blending quantity of complex salt of benzimidazole with copper ions (wt %) | Leaks in high-temperature and high-humidity test | Short circuit occurrences |
|---|---|---|---|
| Sample 19 | 0.005 | 1 | 2 |
| Sample 20 | 0.01 | 0 | 0 |
| Sample 21 | 0.1 | 0 | 0 |
| Sample 22 | 1.0 | 0 | 0 |
| Sample 23 | 2.0 | 0 | 0 |
| Sample 24 | 2.5 | 0 | 0 |

As evidenced by tables 2 through 4, the electrolytic capacitors of this example contain complex salt of an azole ring compound with copper ions in the each electrolyte solution. This results in preventing electrolyte leakage by virtue of an azole ring compound in a high-temperature, high-humidity environment, and additionally suppressing a short circuit caused by dissolution and re-precipitation of copper present on the surface of negative electrode 3C.

For samples 7, 13, 19, containing less than 0.01 wt % of complex salt of an azole ring compound with copper ions in the electrolyte solution, a small amount of complex salt causes a short circuit due to copper precipitation. For samples 12, 18, 24, containing more than 2.0 wt % of complex salt, although a short circuit due to copper precipitation does not occur, the conductivity of the electrolyte solution decreases, and thus the equivalent series resistance of the electrolytic capacitor increases. From these facts, the content of complex salt of an azole ring compound with copper ions in the electrolyte solution is preferably at least 0.01 wt % and at most 2.0 wt %.

Practical Example 3

For samples 25 through 28, 1-methyl imidazole which is an azole ring compound is added when preparing the electrolyte solutions and the content thereof is changed. Capacitor samples are produced in the same way as in practical example 1 except that the capacitor elements are impregnated with the electrolyte solutions respectively and each of the electrolyte solutions is reacted with copper present on the surface of negative electrode 3C by heating in aging process. In the same way, for samples 29 through 32, benzotriazole, which is an azole ring compound, is blended when preparing an electrolyte solution; for samples 33 through 36, imidazole; and for samples 37 through 40, benzimidazole. Here, the electrolyte solution contains 25 wt % of tetramethyl ammonium phthalate, 3 wt % of p-nitrobenzoic acid, 1 wt % of monobutyl phosphoester, and the rest of γ-butyrolactone. After reliability tests are performed for samples 25 through 40 in the same way as in practical example 1, each sample is examined for leakage and a short circuit caused by copper precipitation. In addition, measurement is made of the content of complex salt of an azole ring compound with copper ions in the electrolyte solution after one-hour aging at 90° C. while applying voltage of 12 V. The specifications and evaluation results of each sample are shown in tables 5 through 8.

TABLE 5

Azole ring compound in electrolyte solution

| | 1-methylimidazole | Amount of complex salt with copper ions (wt %) | Leaks in high-temperature and high-humidity test | Short circuit occurrences |
|---|---|---|---|---|
| Sample 25 | 0.01 | 0.004 | 1 | 2 |
| Sample 26 | 0.025 | 0.01 | 0 | 0 |
| Sample 27 | 0.5 | 0.2 | 0 | 0 |
| Sample 28 | 2.0 | 0.5 | 0 | 0 |

TABLE 6

Azole ring compound in electrolyte solution

| | benzotrizole | Amount of complex salt with copper ions (wt %) | Leaks in high-temperature high-humidity test | Short circuit occurrences |
|---|---|---|---|---|
| Sample 29 | 0.01 | 0.004 | 1 | 2 |
| Sample 30 | 0.025 | 0.01 | 0 | 0 |
| Sample 31 | 0.5 | 0.2 | 0 | 0 |
| Sample 32 | 2.0 | 0.5 | 0 | 0 |

TABLE 7

Azole ring compound in electrolyte solution

| | imidazole | Amount of complex salt with copper ions (wt %) | Leaks in high-temperature and high-humidity test | Short circuit occurrences |
|---|---|---|---|---|
| Sample 33 | 0.01 | 0.004 | 1 | 2 |
| Sample 34 | 0.025 | 0.01 | 0 | 0 |
| Sample 35 | 0.5 | 0.2 | 0 | 0 |
| Sample 36 | 2.0 | 0.5 | 0 | 0 |

TABLE 8

Azole ring compound in electrolyte solution

| | benzimidazole | Amount of complex salt with copper ions (wt %) | Leaks in high-temperature and high-humidity test | Short circuit occurrences |
|---|---|---|---|---|
| Sample 37 | 0.01 | 0.004 | 1 | 2 |
| Sample 38 | 0.025 | 0.01 | 0 | 0 |
| Sample 39 | 0.5 | 0.2 | 0 | 0 |
| Sample 40 | 2.0 | 0.5 | 0 | 0 |

As evidenced by tables 5 through 8, as a result that an azole ring compound in the electrolyte solution reacts with copper of negative electrode 3C, the electrolytic capacitor of the example contains complex salt of an azole ring compound with copper ions in the electrolyte solution. This results in preventing electrolyte from leaking by virtue of an azole ring compound in a high-temperature, high-humidity environment, and additionally suppressing a short circuit caused by dissolution and reprecipitation of copper present on the surface of negative electrode 3C.

For samples 25, 29, 33, 37, containing complex salt of less than 0.01 wt %, a small amount of complex salt causes a short circuit due to copper precipitation. From the fact, the content of complex salt of an azole ring compound with copper ions in the electrolyte solution is preferably 0.01% or more.

Here, the copper contained in negative electrode 3C is removed under etching conditions, and thus the electrolyte solution cannot contain 0.5% of complex salt or more in the example.

Practical Example 4

In this example, an electrolyte solution is used containing 25 wt % of tetramethylimidazolinium phthalate, 3 wt % of p-nitrobenzoic acid, 1 wt % of monobutyl phosphoester; 45 wt % of sulfolane as the secondary solvent; and the rest of γ-butyrolactone as the primary solvent. For sample 41, 1-methyl imidazole is used as an azole ring compound; sample 42, benzotriazole; sample 43, imidazole; and sample 44, benzimidazole. The content of complex salt of an azole ring compound with copper ions in the electrolyte solution is set to 0.01 wt % for all the samples. Otherwise, sample capacitors are produced in the same way as in practical example 1.

Comparative sample 2 is produced in the same way as for sample 41 except that an electrolyte solution is used that is free from complex salt of an azole ring compound with copper ions while containing 45 wt % of sulfolane as the secondary solvent.

After reliability tests are performed for samples 41 through 44, and comparative sample 2 in the same way as in practical example 1, each sample is examined for leakage and a short circuit caused by copper precipitation. The specifications and evaluation results of each sample are shown in table 9.

TABLE 9

| | Azole ring compound in electrolyte solution | Leaks in high-temperature and high-humidity test | Short circuit occurrences |
|---|---|---|---|
| Sample 41 | 1-methylimidazole | 0 | 0 |
| Sample 42 | benzotriazole | 0 | 0 |
| Sample 43 | imidazole | 0 | 0 |
| Sample 44 | benzimidazole | 0 | 0 |
| Comparative sample 2 | — | 4 | 13 |

* Amount of complex salt of an azole ring compound with copper ions in the electrolyte solution: 0.01 wt %

As evidenced by table 9, for samples 41 through 44, where the electrolyte solution contains sulfolane as the secondary solvent and complex salt of an azole ring compound with copper ions, electrolyte leakage, high-humidity environment is prevented by virtue of an azole ring compound in a high-temperature, and additionally a short circuit caused by dissolution and reprecipitation of copper present on the surface of negative electrode 3C is suppressed.

Practical Example 5

For sample 45 of the example, the electrolyte solution of sample 1 is blended with 0.1 wt % of complex salt of 1-methyl imidazole with copper ions and 0.1 wt % of complex salt of benzotriazole with copper ions. Here, the electrolyte solution contains 25 wt % of tetramethyl ammonium phthalate, 3 wt % of p-nitrobenzoic acid, 1 wt % of monobutyl phosphoester, and the rest of γ-butyrolactone. Otherwise, sample capacitors are produced in the same way as in practical example 1. After reliability tests are performed in the same way as in practical example 1, each sample is examined for leakage and a short circuit caused by copper precipitation. The specifications and evaluation results of sample 45 are shown in table 10.

TABLE 10

| | Azole ring compound in electrolyte solution | Leaks in high-temperature and high-humidity test | Short circuit occurrences |
|---|---|---|---|
| Sample 45 | 1-methylimidazole 0.1 wt % + benzimidazole 0.1 wt % | 0 | 0 |

As evidenced by table 10, the electrolytic capacitor of the example represents the same effects as practical example 1 even if the azole ring compounds in the electrolyte solution are composed of 1-methyl imidazole and benzotriazole, namely two kinds. Although experiment results are not shown, the azole ring compounds in the electrolyte solution are composed of two or more types out of imidazole, 1-methyl imidazole, benzimidazole, and benzotriazole, the same effects are presented.

Practical Example 6

In this example, 20 wt % ethylene glycol as the secondary solvent and water as the primary solvent are used for the electrolyte solution. Specifically, the electrolyte solution contains 5 wt % of 1,7-octanedicarboxylic acid diammonium, 10 wt % of ammonium adipate, 3 wt % of p-nitrobenzoic acid, 1 wt % of ammonium hypophosphite, 20 wt % of ethylene glycol, and the rest of water. Sample 46 contains 0.01 wt % of complex salt of 1-methyl imidazole as an azole ring compound with copper ions; sample 47, benzotriazole; sample 48, imidazole; and sample 49, benzimidazole.

Comparative sample 3 is produced in the same way as for sample 46 except that an electrolyte solution is used free from complex salt of an azole ring compound with copper ions while containing 20 wt % of ethylene glycol as the secondary solvent.

After reliability tests are performed for samples 46 through 49, and comparative sample 3 in the same way as in practical example 1, each sample is examined for leakage and a short circuit caused by copper precipitation. The specifications and evaluation results of each sample are shown in table 11.

TABLE 11

| | Azole ring compound in electrolyte solution | Leaks in high-temperature and high-humidity test | Short circuit occurrences |
|---|---|---|---|
| Sample 46 | 1-methylimidazole | 0 | 0 |
| Sample 47 | benzotriazole | 0 | 0 |
| Sample 48 | imidazole | 0 | 0 |
| Sample 49 | benzimidazole | 0 | 0 |
| Comparative sample 3 | — | 11 | 18 |

* Amount of complex salt of an azole ring compound with copper ions in the electrolyte solution: 0.01 wt %

As evidenced by table 11, for samples 46 through 49, where the electrolyte solution contains ethylene glycol as the secondary solvent, water as the primary solvent, and complex salt of an azole ring compound with copper ions, electrolyte leakage in a high-temperature, high-humidity environment is prevented by virtue of an azole ring compound, and additionally a short circuit caused by dissolution and reprecipitation of copper present on the surface of negative electrode 3C is suppressed.

In the above-described examples, the description is made for a type of electrolytic capacitor that is produced with positive electrode 3A and negative electrode 3C rolled up with separator 3S disposed therebetween. However, the structure of the electrodes is not limited to this type. Even for an electrolytic capacitor of the type in which sheet-like positive and negative electrodes face each other, an electrolyte solution of the present invention is preferably used to improve reliability in a high-temperature environment. The main material of negative electrode 3C and positive electrode 3A is not limited to aluminum. For positive electrode 3A, a valve metal such as tantalum or niobium may be used. For negative electrode 3C, any conductor may be used as long as it contains copper for facilitating etching. The present invention is not limited to the above-described examples.

INDUSTRIAL APPLICABILITY

In an electrolytic capacitor according to the present invention, an azole ring compound in the electrolyte solution forms complex salt selectively with copper, and the salt is stably present in the electrolyte solution. This state prevents a short circuit caused by dissolution and reprecipitation of copper on the negative electrode and electrolyte leakage. The electrolytic capacitor is suitable for being attached to various types of electronic devices after undergoing a reflow process.

The invention claimed is:

1. An electrolytic capacitor comprising:
   a capacitor element including
      a positive electrode made of a valve metal,
      an etched negative electrode containing copper, and
      a separator disposed between the positive electrode and the negative electrode; and
   an electrolyte solution containing complex salt of an azole ring compound with copper ions, the capacitor element being impregnated with the electrolyte solution, wherein the electrolyte solution contains at least 0.01 wt % and at most 2.0 wt % of the complex salt of the azole ring compound with copper ions.

2. The electrolytic capacitor according to claim 1, wherein the azole ring compound includes at least one of imidazole, 1-methyl imidazole, benzimidazole, and benzotriazole.

3. The electrolytic capacitor according to claim 1, wherein the electrolyte solution contains one of γ-butyrolactone, a mixture of γ-butyrolactone and sulfolane, and a mixture of water and ethylene glycol as a solvent.

4. The electrolytic capacitor according to claim 1, wherein the positive electrode and the negative electrode are mainly made of aluminum.

5. The electrolytic capacitor according to claim 1, wherein the capacitor element is made of the positive electrode, the negative electrode, and the separator, rolled up together.

* * * * *